United States Patent
Bastian et al.

(10) Patent No.: US 6,856,919 B1
(45) Date of Patent: Feb. 15, 2005

(54) DEVICE WITH AT LEAST ONE LASER SENSOR AND METHOD OF OPERATING A LASER SENSOR

(75) Inventors: Andreas Bastian, Braunschweig (DE); Arthur Schneider, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/936,412
(22) PCT Filed: Mar. 6, 2000
(86) PCT No.: PCT/EP00/01936
§ 371 (c)(1), (2), (4) Date: Jan. 23, 2002
(87) PCT Pub. No.: WO00/54070
PCT Pub. Date: Sep. 14, 2000

(30) Foreign Application Priority Data

Mar. 11, 1999 (DE) .......................... 199 10 667

(51) Int. Cl.$^7$ .............................................. G06F 15/00
(52) U.S. Cl. .................... 702/40; 702/158; 340/557; 250/236
(58) Field of Search ................. 702/40, 159, 158; 340/557, 556; 250/236, 334, 392; 362/296

(56) References Cited

U.S. PATENT DOCUMENTS

| 5,313,261 A | 5/1994 | Leatham et al. |
| 5,365,218 A | 11/1994 | Otto |
| 5,495,254 A | 2/1996 | Uemura et al. |

FOREIGN PATENT DOCUMENTS

| DE | 39 03 501 | 8/1989 |
| DE | 40 07 646 | 9/1991 |
| DE | 197 07 936 | 9/1998 |
| EP | 0 816 868 | 1/1998 |

*Primary Examiner*—Kamini Shah
(74) *Attorney, Agent, or Firm*—Kenyon & Kenyon

(57) ABSTRACT

A device for a motor vehicle includes at least one laser sensor. The laser sensor includes a device configured to sweep a scanning area with at least one laser beam emitted by the laser sensor and a power supply device for the laser sensor. In a method for operating a laser sensor in a scanning area with at least one laser beam, the power of the laser beam emitted by the laser sensor is varied in accordance with its direction of radiation.

14 Claims, 1 Drawing Sheet

DEVICE WITH AT LEAST ONE LASER SENSOR AND METHOD OF OPERATING A LASER SENSOR

FIELD OF THE INVENTION

The present invention relates to a device for a motor vehicle, having at least one laser sensor, the laser sensor including a device for sweeping, in a scanning area, at least one laser beam that may be emitted by the laser sensor, and including a power supply for the laser sensor. The present invention also relates to a method for operating a laser sensor of a motor vehicle, in a scanning area, using at least one laser beam.

BACKGROUND INFORMATION

In automotive engineering, information regarding the presence, the distance, and possibly the speed of objects is particularly needed for various control systems. Examples of such control systems or driver-assistance devices include automatic ranging, a pre-crash sensory system that triggers the airbags in a timely manner, lane-changing devices, or park-distance control devices. In this context, various distance sensors based on different physical principles are, in turn, conventional, such as laser, radar, or ultrasound. Laser and/or radar sensors are almost exclusively used in the application field of automatic ranging sensors, a combination of sensors utilizing the specific advantages of the sensors being especially favorable. In the case of automatic ranging systems or lane-change assistance devices, a fixed, single-point scan of the front traffic space is not sufficient, but rather, a certain sector must at least be scanned in order to reliably detect an object. Such sector-shaped emission is inherent to the radar sensor because of the radiation characteristic of its antenna, whereas, in the case of a laser sensor, this must be done actively by moving the laser or an optical system. In so doing, the laser beam is successively swept across the desired sector and scans it for objects. Since safety distances as long as, for example, 50 m are sometimes necessary, the laser must have an appropriately large range. For this purpose, the laser must have a correspondingly high intensity, i.e., it must be operated at a high beam power. However, this results in considerable power losses in the laser sensor, which must be supplied by an energy source and must be dissipated in the form of heat, using appropriate cooling measures. If passive cooling measures, such as heat sinks, do not suffice in this case, then active cooling systems requiring additional energy must be used.

On the other hand, the power output of laser sensors is limited by safety requirements for the benefit of persons in the vicinity of the vehicle, who can be struck by the laser beams and receive an eye injury due to a reflex.

German Published Patent Application No. 39 03 501 describes an optical distance-measuring device for vehicles, which includes a semiconductor laser as an emitter for the very short infrared range. The emitting capacity of the semiconductor laser is automatically adapted to the environmental conditions, especially visibility, by a signal evaluation unit, and is adjusted to conform to eye-safety requirements. The adjustment of the power output of the system is based on the received signal. This means that the emitting power of the system is a direct function of the power of the received echo signal. If an echo signal is not received, because there is no reflecting obstacle in front of the vehicle, then the default emitting power must be selected to be high, in order to cover as large an area as possible in front of the vehicle and to be able to detect obstacles in this area. Therefore, an object appearing suddenly is struck by an unnecessarily intense scanning beam. A high emitting power must also be selected in the case of poorly reflecting obstacles.

In addition, German Published Patent Application No. 197 07 936 describes a method for determining a distance of an obstacle to a vehicle, using an optical distance sensor, where the emitting power of the distance sensor is controlled as a function of the traveling speed, in order to increase eye safety.

It is an object of the present invention to provide a device having a scanning laser sensor, and a method for operating such a device, which, on the average, consume less power over time, without losing considerable amounts of information.

SUMMARY

The present invention provides for the power output of the laser beam emitted by the laser sensor being variable as a function of the direction of the laser beam.

By varying the power input as a function of the position of ken the device for sweeping the laser beam, in which case the laser is supplied more power in areas of high relevance than in the less relevant areas, the average power input of the sensor is reduced, so that both the power supply itself and a potentially necessary cooling system may be dimensioned to be smaller, and at the same time, the eye safety is increased. The increased service life of the laser sensor may be regarded as a further advantage of the present invention.

An example embodiment of the present invention provides for the characteristic curve of the laser sensor's beam power being continuously varied.

Another example embodiment of the present invention provides for the maximum power of the laser sensor and/or the power characteristic across the scanning area being selected as a function of the vehicle speed.

This arrangement provides the advantage of the beam power of the laser sensor being adapted to the actual requirements of the driving situation, and the danger to people being further reduced.

Furthermore, it may be provided that the maximum beam power of the laser sensor and/or the power characteristic across the scanning area be selected as a function of a detected object, thereby allowing both the distance of the object and, whether the object is a living thing or an article, to play a role. In particular, the location of the object with respect to the vehicle or the laser sensor is important for the characteristic of the beam power.

DETAILED DESCRIPTION

Figure 1:
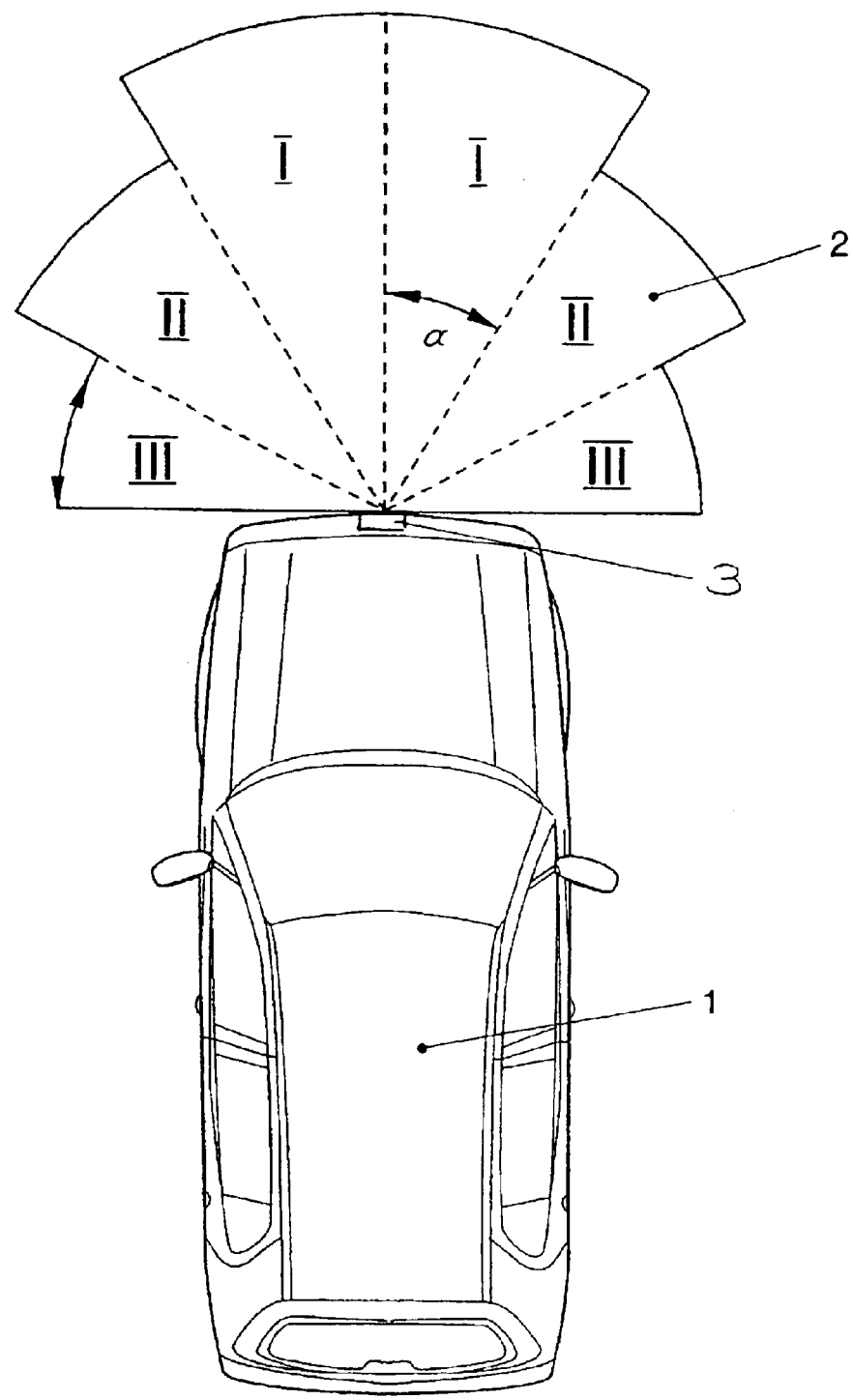
FIG. 1 is a top plan view of a scanning area of a laser-scan distance-sensing system according to the present invention.

The present invention is explained below in detail, using an example embodiment. FIG. 1 illustrates a scanning area of a laser-scan distance-sensing system.

Illustrated in FIG. 1 is a motor vehicle 1 having a scanning laser sensor 3 positioned in the front area of motor vehicle 1, the scanning laser sensor being, for example, a component of an automatic ranging system and a lane-change assistance device. Laser sensor 3 includes a transmitter unit, which emits laser radiation, and a receiving device, which receives laser radiation reflected by objects or obstacles, and may evaluate it according to propagation time and angle of incidence. In addition, laser sensor 3 includes a device configured to horizontally sweep the laser beam across a scanning range 2, which is 180° in the illustrated example embodiment of the present invention. However, scanning ranges of up to 360° are also possible. The device configured to sweep the laser beam may either swing the laser as a whole or may be in the form of a suitable optical system. The laser sensor is assigned a power supply, which allows the laser sensor a variable power input that it converts into laser radiation. The larger the beam power made available by the energy supply, the higher the intensity and, thus, the larger the range of laser sensor 3.

In an automatic ranging system, for example, the other motor vehicles directly in front of motor vehicle 1, which must also be reliably detected from a longer distance, are of interest, whereas motor vehicles in adjacent lanes are not as interesting. For example, they are only of interest in the immediate vicinity of motor vehicle 1, in case the motor-vehicle driver plans to change lanes, and it must be checked if motor vehicles are in the desired lane, and if one may change lanes without risk. On the basis of these preconsiderations, the range of laser sensor 3 may be chosen to be smaller in the segments that the scanning area sweeps over adjacent lanes. This arrangement is illustrated in a discrete form in FIG. 1, three different segments I, II, and III having been selected. In this context, Segment I, for example, spans an scanning angle of −30° to 30°, and is used for detecting motor vehicles traveling directly in front. In this area, laser sensor 3 is operated at the highest power, and therefore, at the longest range. Segment II covers motor vehicles, which are in adjacent lanes, and may possibly move into the lane of the vehicle in question, i.e., may be taken into consideration during a lane change, this segment II spanning, for example, a scanning angle of −60° to −30° and 30° to 60°. Motor vehicles that are nearly adjacent are detected in segment III, so that a range of 4 to 5 m may be completely sufficient. Therefore, the average required power may be reduced without loss of information. In addition, the optical power sweeping over a possible, adjacent sidewalk is reduced, so that the risk of damaging the eyesight of passers-by is reduced.

Apart from a stepped reduction in the intensity, the intensity may also be reduced continuously from the mid-position, i.e., the intensity function i(α) is a continuous function. In specific example embodiments of the present invention, where two laser-scan sensors 3 are situated on the right and left, in the front area of motor vehicle 1, angular distribution i(α) is selected in a correspondingly different manner, so that the most relevant areas may be scanned at the highest intensity.

Since the safety distance to be kept is dependent on the speed, the laser is operated, in particular in segment I, at an intensity that increases with the speed. Another option for further variation of the intensity is to pass through the different segments at different scanning speeds. Thus, segment III, for example, may be traversed at a higher scanning speed, in order to further reduce the risk of injuring passers-by.

What is claimed is:

1. A device for a motor vehicle, comprising:
   at least one laser sensor configured to determine at least one of a position and a distance of an object in a scanning area, the laser sensor including:
      a device configured to sweep at least one laser beam emitted by the laser sensor in the scanning area; and
      a power supply configured to vary a power of the laser beam as a function of a beam direction.

2. The device according to claim 1, wherein the power supply is configured to supply variable power to the laser sensor, the power supply being further configured to supply power to the laser sensor as a function of the laser beam direction.

3. A device for a motor vehicle, comprising:
   at least one laser sensor configured to determine at least one of a position and a distance of an object in a scanning area, the laser sensor including:
      a device configured to sweep at least one laser beam emitted by the laser sensor in the scanning area; and
      a power supply configured to vary a power of the laser beam as a function of a beam direction;
   wherein the scanning area is subdivided into segments, each segment having a different detection relevance, and wherein the power supply is configured to supply more power to a first segment having a higher detection relevance and to supply less power to a second segment having a lesser detection relevance.

4. The device according to claim 1, wherein a characteristic curve of the laser beam power is continuously variable.

5. A device for a motor vehicle, comprising:
   at least one laser sensor configured to determine at least one of a position and a distance of an object in a scanning area, the laser sensor including:
      a device configured to sweep at least one laser beam emitted by the laser sensor in the scanning area; and
      a power supply configured to vary a power of the laser beam as a function of a beam direction;
   wherein at least one of a maximum power of the laser sensor and a power characteristic across the scanning area is a function of a motor vehicle speed.

6. A device for a motor vehicle, comprising:
   at least one laser sensor configured to determine at least one of a position and a distance of an object in a scanning area, the laser sensor including:
      a device configured to sweep at least one laser beam emitted by the laser sensor in the scanning area; and
      a power supply configured to vary a sower of the laser beam as a function of a beam direction;
   wherein the device configured to sweep the at least one laser beam is further configured to sweep the at least one laser beam to traverse the scanning area at different scanning speeds.

7. A device for a motor vehicle, comprising:
   at least one laser sensor configured to determine at least one of a position and a distance of an object in a scanning area, the laser sensor including:
      a device configured to sweep at least one laser beam emitted by the laser sensor in the scanning area; and
      a power supply configured to vary a power of the laser beam as a function of a beam direction;
   wherein at least one of a maximum power of the at least one laser sensor and a power characteristic across the scanning area is a function of at least one of a distance of an object detected by the laser sensor, a direction of an object detected by the laser sensor and a type of an object detected by the laser sensor.

8. A method for operating a laser sensor of a motor vehicle to ascertain at least one of a position and a distance of an object in a scanning area, comprising the steps of;
   sweeping at least one laser beam in the scanning area; and
   varying a power of the at least one laser beam as a function of a beam direction.

9. A method for operating a laser sensor of a motor vehicle to ascertain at least one of a position and a distance of an object in a scanning area, comprising the steps of:

sweeping at least one laser beam in the scanning area;

varying a power of the at least one laser beam as a function of a beam direction;

subdividing the scanning area into segments, each segment having a different detection relevance; and emitting the at least one laser beam at a higher beam power in a first segment having a higher detection relevance and at a lower beam power in a second segment having a lesser detection relevance.

10. The method according to claim 9, further comprising the step of emitting the at least one laser beam at a maximum beam power in a direction of travel of the motor vehicle.

11. The method according to claim 8, further comprising the step of continuously varying a beam power characteristic of the at least one laser beam.

12. A method for operating a laser sensor of a motor vehicle to ascertain at least one of a position and a distance of an object in a scanning area, comprising the steps of:

sweeping at least one laser beam in the scanning area;

varying a power of the at least one laser beam as a function of a beam direction; and selecting at least one of a maximum beam power of the at least one laser beam and a power characteristic of the at least one laser beam across the scanning area as a function of a vehicle speed.

13. A method for operating a laser sensor of a motor vehicle to ascertain at least one of a position and a distance of an object in a scanning area, comprising the steps of:

sweeping at least one laser beam in the scanning area;

varying a power of the at least one laser beam as a function of a beam direction; and traversing the scanning area of the laser sensor at different scanning speeds.

14. A method for operating a laser sensor of a motor vehicle to ascertain at least one of a position and a distance of an object in a scanning area, comprising the steps of:

sweeping at least one laser beam in the scanning area;

varying a power of the at least one laser beam as a function of a beam direction; and selecting at least one of a maximum beam power of the at least one laser sensor and a power characteristic across the scanning area as a function of at least one of a distance of an object detected by the laser sensor, a direction of an object detected by the laser sensor and a type of an object detected by the laser sensor.

* * * * *

UNITED STATES PATENT AND TRADEMARK OFFICE
CERTIFICATE OF CORRECTION

PATENT NO.   : 6,856,919 B1
DATED        : February 15, 2005
INVENTOR(S)  : Andreas Bastian et al.

It is certified that error appears in the above-identified patent and that said Letters Patent is hereby corrected as shown below:

Column 4,
Line 42, change "sower" to -- power --.

Signed and Sealed this

Eighth Day of November, 2005

JON W. DUDAS
*Director of the United States Patent and Trademark Office*